US008548405B2

(12) United States Patent
Vogas

(10) Patent No.: US 8,548,405 B2
(45) Date of Patent: Oct. 1, 2013

(54) INDIVIDUALLY PHASE CONTROLLED RF OSCILLATORS FOR ANTENNA BEAM STEERING

(75) Inventor: Michael S. Vogas, Morristown, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 13/455,745

(22) Filed: Apr. 25, 2012

(65) Prior Publication Data

US 2012/0289175 A1 Nov. 15, 2012

Related U.S. Application Data

(60) Provisional application No. 61/483,987, filed on May 9, 2011, provisional application No. 61/484,003, filed on May 9, 2011.

(51) Int. Cl.
*H04B 17/00* (2006.01)

(52) U.S. Cl.
USPC ............ 455/115.1; 455/115.2; 455/67.11; 455/126; 455/323; 455/334; 375/355; 375/371; 375/373

(58) Field of Classification Search
USPC ............ 455/115.1, 334, 323, 67.11, 126, 455/115.2; 375/355, 371, 373
See application file for complete search history.

(56) References Cited

U.S. PATENT DOCUMENTS

| 4,652,834 | A * | 3/1987 | McAdam | 329/311 |
|---|---|---|---|---|
| 7,375,593 | B2 * | 5/2008 | Self | 331/16 |
| 7,567,642 | B2 * | 7/2009 | White | 375/376 |
| 7,983,371 | B2 * | 7/2011 | McCorkle et al. | 375/355 |
| 2003/0181191 | A1 * | 9/2003 | Gentzler | 455/334 |

OTHER PUBLICATIONS

R.C.Johnson and H. Jasik, Antenna Engineering Handbook, McGraw-Hill (2d ed. 1984), at pp. 20-1 to 20-5.
Analog Devices, Wideband Synthesizer with Integrated VCO—ADF4350, Data Sheet p. 24 (2011).

* cited by examiner

*Primary Examiner* — Sanh Phu
(74) *Attorney, Agent, or Firm* — Leo Zucker; Daniel J. Long

(57) ABSTRACT

A method of controlling the phases of RF output signals from a number of radio transmitters. A given radio has at least one synthesizer as a source of its RF output signal, and the synthesizer produces an output the phase offset of which relative to a reference signal is controlled by a phase offset command. A path from an antenna port of the radio obtains a fed back RF output signal and a phase difference between the reference signal and the fed back RF output signal is measured. A value of a zero degree phase offset command for the synthesizer is determined such that the phase difference between the reference signal and the fed back RF signal is nominally zero, and the value is stored. A phase offset command for providing a desired phase offset for the RF output signal is then determined based the stored value of the zero degree phase offset command.

7 Claims, 3 Drawing Sheets

INDIVIDUALLY PHASE CONTROLLED RF OSCILLATORS FOR ANTENNA BEAM STEERING

CROSS REFERENCE TO RELATED APPLICATIONS

This application claims priority under 35 U.S.C. Sec. 119(e) of U.S. Provisional Patent Applications No. 61/483,987 filed May 9, 2011, titled "Core Engine Enabled Antenna Beam Steering", and No. 61/484,003 filed May 9, 2011, titled "Individually Phase Controlled RF Oscillators", both of which are incorporated by reference in their entireties.

BACKGROUND OF THE INVENTION

1. Field of the Invention

The present invention relates to radio antenna beam steering, and particularly to controlling the phases of radio frequency signals applied to corresponding antennas or antenna elements for beam steering.

2. Discussion of the Known Art

As illustrated in FIG. 1, when used as local oscillators (LOs) in a communications radio 10-1, RF synthesizers 12, 14 typically produce output signals LO1, LO2 the phases of which are locked to that of a common reference signal 16 supplied in the radio 10-1. If the transmitters in multiple transceivers or radios 10-1 to 10-N are used to excite N antennas or antenna elements 20-1 to 20-N of an antenna array 22, then the phase of each RF output signal 24-1 to 24-N applied to the antennas by the radios should be locked to a common or master reference signal so that a main beam of the array can be formed and steered accurately in a desired direction. See, e.g., R. C. Johnson, et al., Antenna Engineering Handbook, McGraw-Hill (1984), at pages 20-1 to 20-5. Due to phase shifts that commonly occur in one or more mixer stages 26, 28 of each radio transmitter during frequency conversions, and in subsequent RF circuits 30 leading to the antenna, the phase of an RF output signal 24-n applied at antenna 20-n (n=1 to N) is no longer locked to that of the reference signal 16 applied to the RF synthesizers 12, 14 in the radio 10-n.

A need therefore exists for an arrangement and technique by which the phases of each of the RF output signals 24-1 to 24-N applied by the radios to the antennas 20-1 to 20-N can be accurately set to a desired value relative to a common phase reference.

SUMMARY OF THE INVENTION

According to the invention, a method of controlling the phase of radio frequency (RF) output signals from a number of radios, includes providing a given radio with at least one oscillator or synthesizer as a source of the RF output signal from the radio, and configuring the synthesizer to produce an output the phase of which is controlled by a phase offset command to a desired value relative to the phase of a reference signal. A path from an antenna port of the radio is provided to obtain a fed back RF output signal, and a phase difference between the reference signal and the fed back RF output signal is measured.

The value of a zero degree phase offset command for the synthesizer whereby the phase difference between the input reference signal and the fed back RF signal is nominally zero, is determined and stored. The value of a phase offset command for providing a desired phase offset for the RF output signal from the radio is then determined based on the value of the stored zero degree phase offset command.

For a better understanding of the invention, reference is made to the following description taken in conjunction with the accompanying drawing and the appended claims.

DETAILED DESCRIPTION OF THE INVENTION

Figure 1:
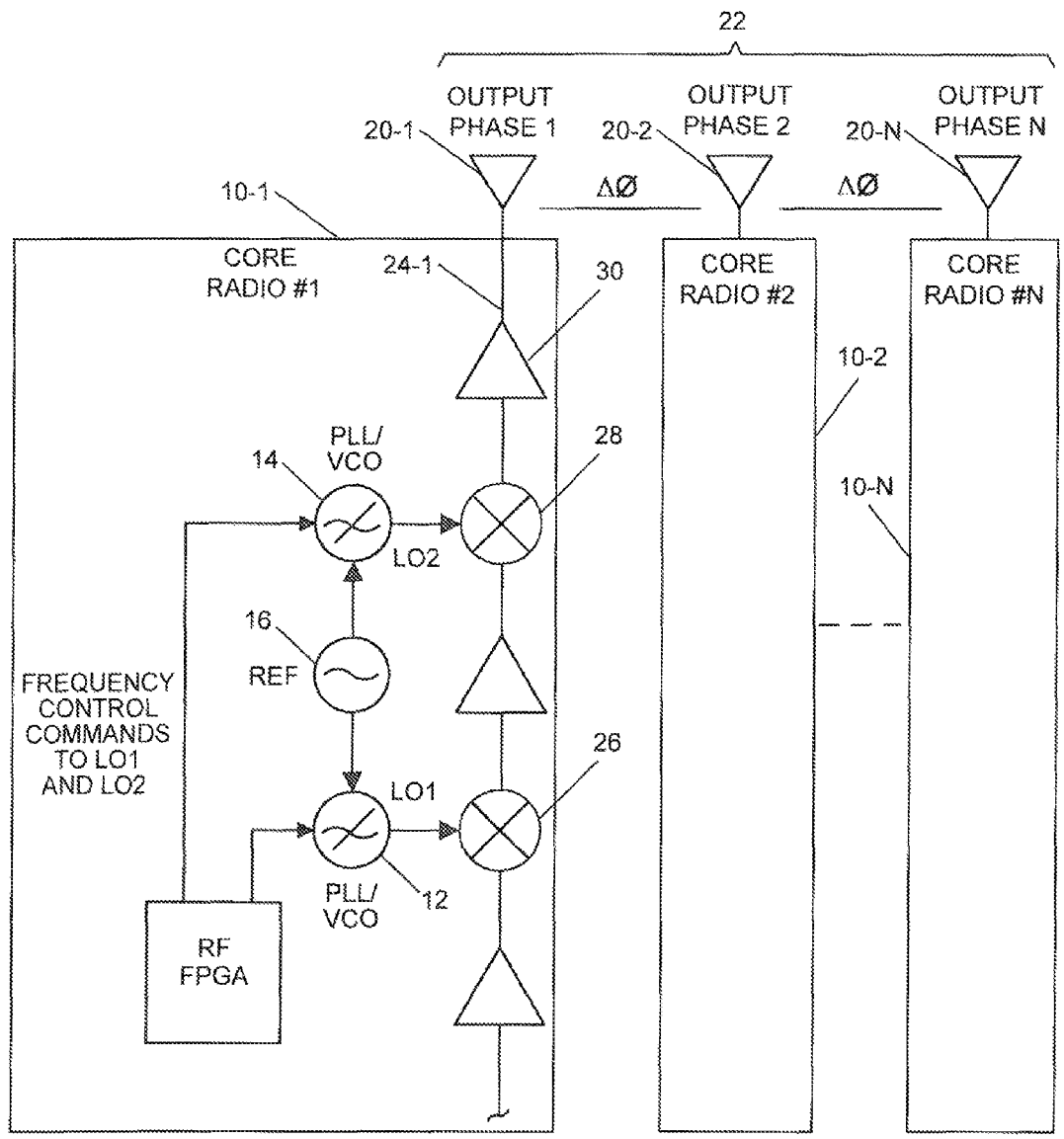
FIG. 1 is a schematic block diagram of a prior arrangement in which RF signals from a number of radios are applied to antenna elements of a phased antenna array.
Figure 2:
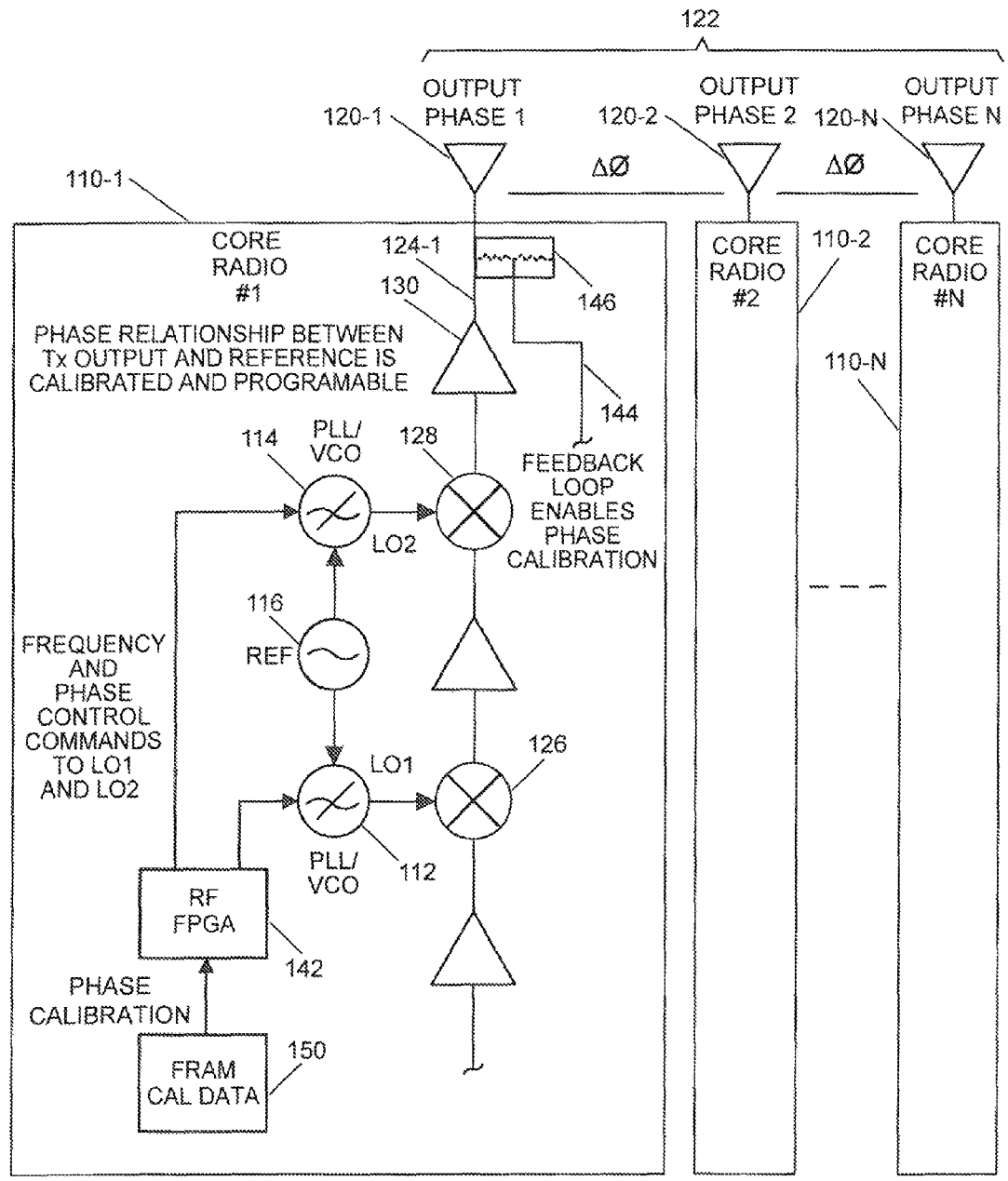
FIG. 2 is a schematic block diagram of an arrangement wherein RF signals from a number of radios are applied to antenna elements of a phased antenna array according to the invention.

FIG. 2 illustrates a bank of N communication radios 110-1 to 110-N, each arranged with a transmitter for exciting a corresponding one of N antennas or antenna elements 120-1 to 120-N of an antenna array 122. RF output signals 124-1 to 124-N applied by the radios to the antenna elements are phase controlled relative to one another and to a common reference signal 116. Shifting the phase of the RF output signal emitted from a given radio 110-$n$ (n=1 to N) provides either constructive or destructive interference with signals emitted from the other radios, and serves to form and direct a beam of the antenna array 122 in a desired direction. In the embodiment of FIG. 2, the ability of each radio 110-$n$ to control the phase of its RF output signal 124-$n$ relative to the other radios is achieved by the use of commercially available components that are operatively connected with a radio frequency (RF) FPGA 142, a phase control feedback path 144, and certain phase calibration techniques.

In the illustrated embodiment, the local RF oscillators 112, 114 in each radio 110-$n$ implement a known Phase Resync feature of a type ADF4350 synthesizer device, available from Analog Devices, Inc. See, Data Sheet, Analog Devices—Wideband Synthesizer with Integrated VCO—ADF4350, at page 24. The entire Data Sheet is incorporated herein by reference, and the following text is taken from page 24:

"PHASE RESYNC

The output of a fractional-N PLL can settle to any one of the MOD phase offsets with respect to the input reference, where MOD is the fractional modulus. The phase resync feature in the ADF4350 produces a consistent output phase offset with respect to the input reference. This is necessary in applications where the output phase and frequency are important, such as digital beam forming. See the Phase Programmability section to program a specific RF output phase when using phase resync.

Phase resync is enabled by setting Bits [DBI6:DBI5] in Register 3 to 1, 0.

When phase resync is enabled, an internal timer generates sync signals at intervals of $t_{SYNC}$ given by the following formula:

$$t_{SYNC} = \text{CLK\_DIV\_VALUE} \times \text{MOD} \times t_{PFD}$$

where:

$t_{PFD}$ is the PFD reference period

CLK_DIV_VALUE is the decimal value programmed in Bits [DB14:DB3] of Register 3 and can be any integer in the range of 1 to 4095.

MOD is the modulus value programmed in Bits [DBI4:DB3] of Register 1 (R1).

When a new frequency is programmed, the second sync pulse after the LE rising edge is used to resynchronize the output phase to the reference. The $t_{SYNC}$ time is to be programmed to a value that is as least as long as the worst-case lock time. This guarantees the phase resync occurs after the last cycle slip in the PLL settling transient.

Phase Programmability

The phase word in Register 1 controls the RF output phase. As this word is swept from 0 to MOD, the RF output phase sweeps over a 360° range in steps of 360°/MOD."

Thus, with the ADF4350 synthesizer configured as a fractional-N PLL, the output of the synthesizer can be made to settle at specified RF output phase offsets with respect to the input reference. The range of the RF output phase offset is 0 to 360°, and the phase offset step size resolution is 360°/MOD, where MOD is the value of the PLL fractional modulus.

Figure 3:
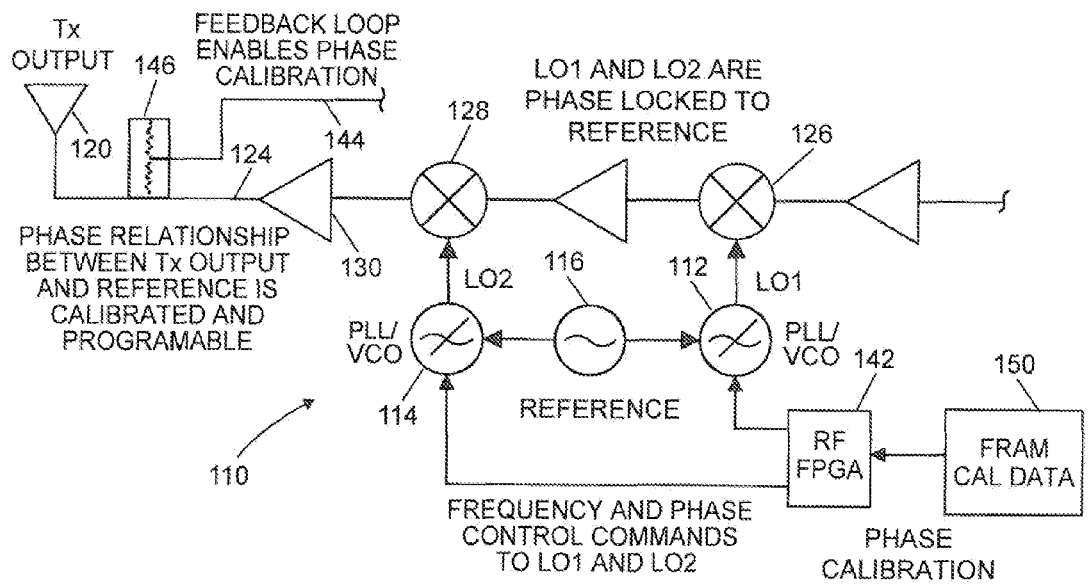
FIG. 3 is a schematic block diagram of one of the radios in FIG. 1.
Figure 4:
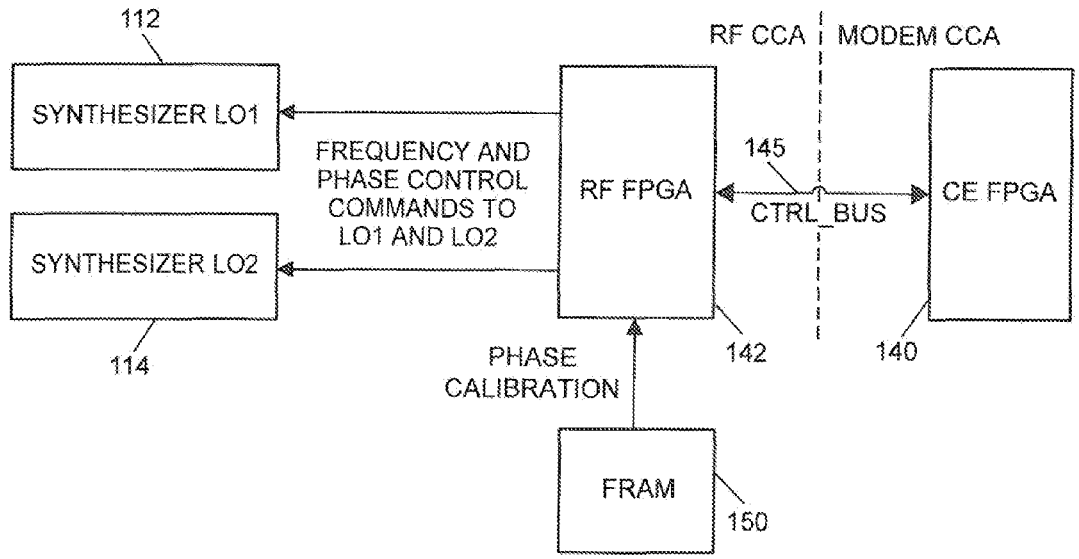
FIG. 4 is a block diagram of the radio in FIG. 3 with an associated control bus.

As shown in FIGS. 3 and 4, a communications radio 110 constructed according to the invention has two individually phase controlled RF local oscillator (LO) stages 112, 114 in its transmitter. It will be understood that the invention may also be used in radios having only a single LO stage, or more than two such stages. The use of the two LO stages 112, 114 provides more flexibility than only one stage in setting the phase offset of the RF output signal 124 incrementally with respect to the reference signal 116, however. In the illustrated embodiment, the LO stages 112, 114 are each comprised of the mentioned type ADF4350 wideband synthesizer (or equivalent) that functions as a PLL local oscillator 112, 114 and drives the mixers 126, 128 in the frequency conversion stages of the radio 110.

Accurate control of the phase offset of the RF output signal 124 relative to the reference signal 116, is implemented by providing both frequency tune and phase offset tune commands for each of LO1 and LO2. The following sequence of steps can be used to tune the phase offsets for LO1 and LO2.

A field programmable gate array (FPGA) 142 that typically only provides commands for controlling the frequencies of LO1 and LO2 in the radio 110, is configured also to produce commands for controlling the phases of the signals produced by LO1 and LO2 to drive the mixers 126, 128. Commands to the FPGA 142 to tune the RF output signal 124 to a different frequency and/or phase offset may originate from, for example, a waveform FPGA 140 associated with the radio 110 and which is logically connected with the FPGA 142 through a control bus 145. See FIG. 4.

To compensate for inherent phase shifts that occur in the mixers 126, 128 and the RF circuitry 130 leading to the antenna 120, a phase calibration scheme is used to calibrate the radio 110 for a zero degree phase offset. Once a command word for obtaining the zero degree phase offset is determined and stored, the individually phase controlled oscillators 112, 114 (LO1, LO2) can be accurately set to provide a desired relative phase for the RF output signal 124. Without the prestored zero degree phase shift command word, phase variations along the signal transmission paths in the radios 110-1 to 110-N (FIG. 2) can alter the accuracy of a commanded phase shift for any given radio. This condition is bound to occur absent an initial calibration, because every radio has phase variations attributable to non-exact analog components (mixers, amps, filters, etc.). Calibration for a zero degree phase shift over frequency for each radio overcomes these variations by establishing a constant set of values for obtaining a zero degree phase error for the LOs of each radio transmitter relative to a common reference signal.

A procedure to calibrate the phase registers of the LO synthesizers 112, 114 for a zero degree phase shift is as follows. See FIGS. 3 and 4.

An electronically controlled RF switch 146 is arranged at the antenna port of each radio 110 to provide an RF feedback loop or path 144. The phase of the fed back RF signal relative to the reference signal 116 is measured by, e.g., a network analyzer arranged to measure a phase difference between two of its ports for a desired frequency band of operation. The measured signals are (a) the reference signal 116 which may be injected from the waveform FPGA 140 to the radio, and (b) the fed back RF signal from the antenna port via the path 144. Alternatively, the fed back antenna signal can be redirected to the waveform FPGA 140, wherein a phase correlator is arranged to search for a maximum phase correlation of zero degrees between the signal injected by the waveform FPGA 140 and the one returned by the path 144.

Tune commands that should correspond to a nominal zero degree phase are then sent from the RF FPGA 142 to the LO1 and the LO2 synthesizers. As a result of the commands, a phase shift in the fed back RF signal is produced. The phase difference between the reference signal 116 and the fed back RF signal is measured, and the value in the phase register of each synthesizer is adjusted until a zero degree phase difference, or a maximum correlation to a zero degree phase difference, is obtained. At that point, the values in the phase registers that obtain the zero degree phase difference are stored, preferably in a ferroelectric nonvolatile RAM (FRAM) 150 that is mounted within or on a part of the radio 110.

After the calibration and on power up, the waveform FPGA 140 reads the calibration values from the FRAM 150 through the RF FPGA 142 and the control bus 145, and stores the data in an associated memory. The foregoing procedure may be repeated for various frequencies for calibration across the operating range of the synthesizers, and to produce a corresponding calibration table that accounts for variations in the zero degree phase command words over the full operating range of the synthesizers. Coarseness of the table can vary depending on frequency coverage.

In normal operation, the FPGA 142 operates to recall the previously calibrated command word settings (preferably in hex) that obtain a zero degree phase offset for the RF output signal, from the predetermined and stored calibration table. The FPGA 142 then uses the zero degree phase offset words for LO1 and LO2 as a basis to add or subtract values that achieve the appropriate phase offset control for each radio. Upon receipt of a new tune command, the FPGA 142 sends corresponding frequency and/or phase resync control data to the LO1 and the LO2 synthesizers, always in relation to the calibrated zero degree phase command word.

While the foregoing represents preferred embodiments of the present invention, it will be understood by persons skilled in the art that various modifications, additions, and changes can be made without departing from the spirit and scope of the invention. As mentioned, one such variation is the use of only one LO synthesizer in the transmitter of the radio. While this would allow for an easier calibration scheme, it may reduce the size of the increments in which the phase of the RF output signal can be varied, since the phase of only one LO would be set as a function of the MOD setting for the synthesizer. Accordingly, the invention includes all such modifications and changes that are within the scope of the appended claims.

I claim:

1. A method of controlling the phase of radio frequency (RF) output signals from a number of radios, comprising:

providing a given radio at least one oscillator or synthesizer as a source of the RF output signal from the radio, and configuring the synthesizer to produce an output the phase of which is controlled by a phase offset command to a desired value relative to the phase of a reference signal;

providing a path from an antenna port of the radio to obtain a fed back RF output signal;

measuring a phase difference between the reference signal and the fed back RF output signal, and determining a value of a zero degree phase offset command for the synthesizer whereby the phase difference between the input reference signal and the fed back RF signal is nominally zero;

storing the value of the determined zero degree phase offset command; and determining, according to the value of the stored zero degree phase offset command, the value of a phase offset command for providing a desired phase offset for the RF output signal from the radio.

2. The method of claim 1, including applying the RF output signal from the given radio to an antenna or an element of an antenna array.

3. The method of claim 2, including applying the phase offset command for providing a desired phase offset for the RF output signal from the given radio, to the synthesizer of the radio.

4. The method of claim 1, including providing a memory on or in a part of the given radio, and storing the determined value of the zero degree phase offset command for the radio in the memory.

5. The method of claim 1, including configuring a RF FPGA of the given radio to apply the phase offset commands to the synthesizer of the radio.

6. The method of claim 5, including configuring the RF FPGA of the given radio to apply commands to the synthesizer for setting the frequency of the output from the synthesizer.

7. The method of claim 1, including associating a waveform FPGA with the given radio, logically connecting the waveform FPGA with the RF FPGA of the radio, and writing the stored the value of the zero degree phase offset command for the radio to the waveform FPGA when powering up the radio.

* * * * *